United States Patent
Bastide et al.

(10) Patent No.: US 10,671,142 B2
(45) Date of Patent: Jun. 2, 2020

(54) SOCIAL-GEOFENCED-BASED APPLICATION MANAGEMENT FOR BATTERY MAXIMIZATION

(71) Applicant: International Business Machines Corporation, Armonk, NY (US)

(72) Inventors: Paul R. Bastide, Boxford, MA (US); Tushar Kumar Jayantilal, Coppell, TX (US); Fang Lu, Billerica, MA (US); Ishwarya Rajendrababu, Hobooken, NJ (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 15/957,558

(22) Filed: Apr. 19, 2018

(65) Prior Publication Data
US 2019/0324519 A1   Oct. 24, 2019

(51) Int. Cl.
*G06F 1/3228* (2019.01)
*G06F 9/445* (2018.01)
*H04L 29/08* (2006.01)

(52) U.S. Cl.
CPC ........ *G06F 1/3228* (2013.01); *G06F 9/44505* (2013.01); *H04L 67/18* (2013.01); *H04L 67/22* (2013.01)

(58) Field of Classification Search
None
See application file for complete search history.

(56) References Cited

U.S. PATENT DOCUMENTS

| | | | |
|---|---|---|---|
| 8,655,307 B1 * | 2/2014 | Walker | H04W 52/0212 455/405 |
| 8,732,487 B2 | 5/2014 | Goraczko et al. | |
| 8,768,648 B2 | 7/2014 | Panther et al. | |
| 8,949,629 B2 | 2/2015 | Chakra et al. | |
| 8,984,628 B2 | 3/2015 | Mahaffey et al. | |
| 9,311,484 B2 | 4/2016 | Dolph et al. | |
| 9,442,181 B2 | 9/2016 | Haik et al. | |
| 2012/0023223 A1 * | 1/2012 | Branch | G06F 9/4856 709/224 |
| 2015/0082097 A1 | 3/2015 | Brewer et al. | |
| 2015/0163224 A1 * | 6/2015 | Kim | H04L 63/1441 726/27 |
| 2015/0304437 A1 | 10/2015 | Vaccari et al. | |
| 2015/0350351 A1 * | 12/2015 | Tung | H04L 67/18 709/204 |
| 2016/0286352 A1 | 9/2016 | Lynch et al. | |
| 2016/0359986 A1 * | 12/2016 | Jones | G06F 16/29 |
| 2017/0041852 A1 | 2/2017 | Gruet et al. | |

* cited by examiner

*Primary Examiner* — Scott B Christensen
(74) *Attorney, Agent, or Firm* — Konrad Raynes Davda & Victor LLP; Rabindranath Dutta

(57) ABSTRACT

A method, system and computer program product for providing social-geofenced-based application management for battery maximization. Social traffic information is collected for a defined cohort of persons within one or more predefined geofences, wherein the defined cohort of persons is based on one or more individual or group attributes, and the social traffic information includes battery usage for devices used by the defined cohort of persons. The social traffic information is analyzed to classify conditions derived therefrom into one or more categories. Application performance is controlled on a user's device, based on the conditions classified into the categories, to optimize battery usage of the user's device.

18 Claims, 6 Drawing Sheets

SOCIAL-GEOFENCED-BASED APPLICATION MANAGEMENT FOR BATTERY MAXIMIZATION

BACKGROUND

The present invention relates generally to a method and system for social-geofenced-based application management for battery maximization.

Battery life for devices is a critical factor in the utility of the devices. This is especially true when a user forgets to plug-in a device, or the user forgets a cable to plug-in the device, or the battery drains unexpectedly due to application usage.

SUMMARY

The invention provided herein has many embodiments useful, for example, in implementing a method, system and computer program product for providing social-geofenced-based application management for battery maximization.

Social traffic information is collected for a defined cohort of persons within one or more predefined geofences, wherein the defined cohort of persons is based on one or more individual or group attributes, and the social traffic information includes battery usage for devices used by the defined cohort of persons. The social traffic information is analyzed to classify conditions into one or more categories. Application performance is controlled on a user's device, based on the conditions classified into the categories, to optimize battery usage of the user's device.

The analysis of social traffic information may include identifying any changes to the user's routine based on the social traffic information, and determining how best to optimize the battery usage of the user's device resulting from the changes. The analysis of social traffic information also may include analyzing the social traffic information to identify events in a vicinity of the predefined geofences, wherein the events comprise work-related events, social events with co-workers, social events with family members, public events, or other types of social events.

The application performance may be controlled to prevent transmitting data to or from the user's device. The application performance also may be controlled to execute or not execute specified applications on the user's device. In one embodiment, the application performance is controlled by sending one or more rules to the user's device for execution by a rule engine on the user's device.

Messages also may be sent to notify the user's device of rule updates or charging reminders.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

If the user follows a general daily routine with their devices' usage and charging, then they may be able to remember to charge their devices on time. However, when the situation, activity pattern, or social geofencing is changed around the user, then the user's routine regarding their devices may need to be adjusted.

Overall, there is a critical need to intelligently identify how to best utilize battery life based on the user's daily plan, date/time and location. The present invention satisfies that need.

The present invention comprises a computer-implemented system and method for providing social-geofenced-based application management for battery maximization. Given a location for a user's device, the invention manages application behaviors on the user's device to maximize battery usage, by:

retrieving social traffic information, including battery usage, of related users based on location;

identifying any changes in the location and/or social traffic information that diverge from the user's daily routine;

determining the best way to optimize the battery usage on a user's device based on the location and/or social traffic information; and recommending application behaviors to the user's device traveling in the location to limit the battery usage over a given geofenced area as determined by the social traffic information.

Additional considerations include aggregating the social traffic information across multiple locations.

Hardware and Software Environment

Figure 1:
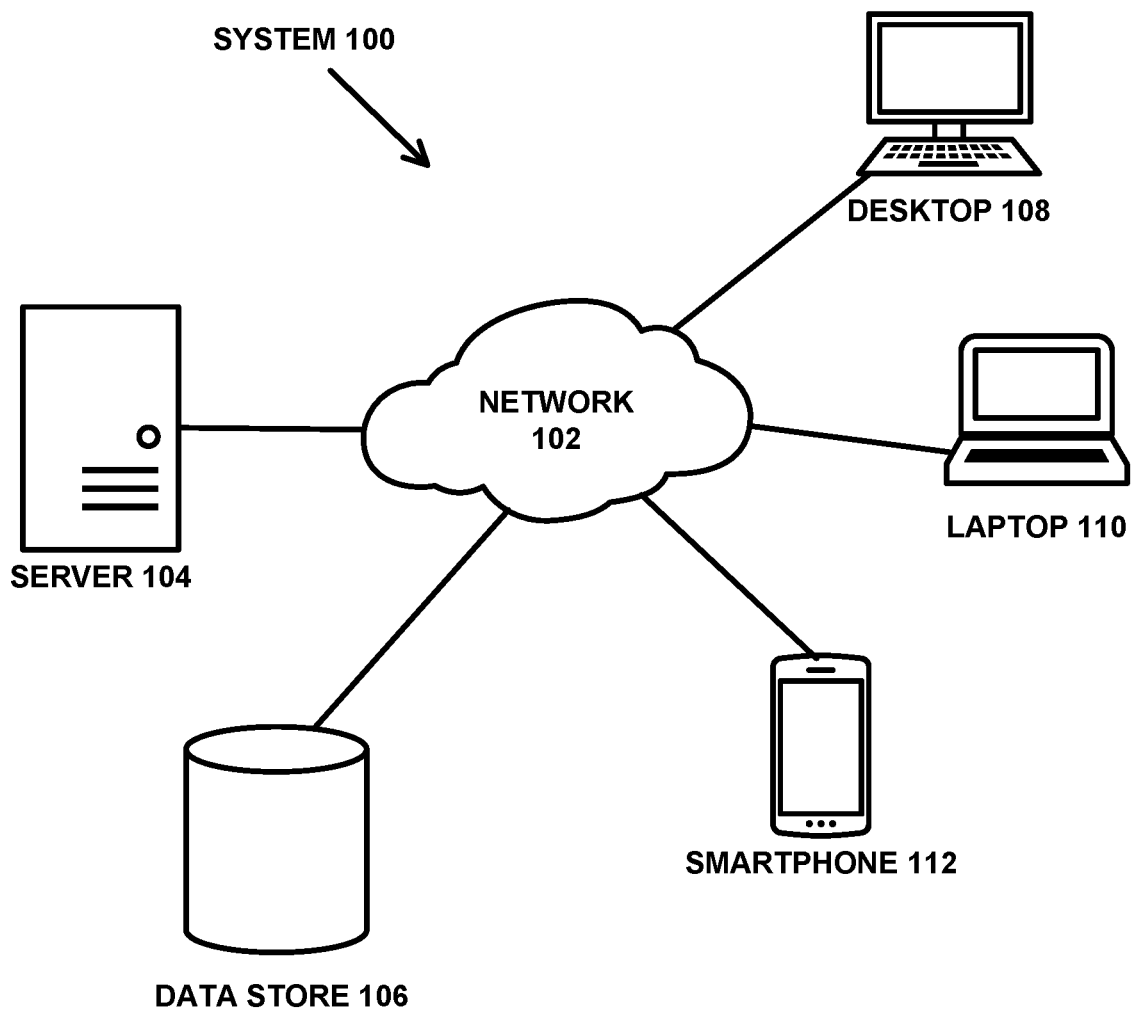
FIG. 1 is a pictorial representation of a system for providing social-geofenced-based application management for battery maximization, according to one embodiment.

FIG. 1 is a pictorial representation of a system 100 for providing social-geofenced-based application management for battery maximization, according to one embodiment.

The system 100 includes a network 102, which is the medium used to provide communications links between various devices and computers connected within the system 100. In the depicted example, the network 102 may be the Internet or another network.

One or more server computers 104 are connected to the network 102, along with one or more data stores 106. In addition, one or more client devices 108, 110, 112 are connected to the server computers 104 and data stores 106 via the network 102.

Typically, these client devices 108, 110, 112 comprise, for example, desktop computers 108, laptop or notebook computers 110, smartphones 112 and other devices. However, the client devices 108, 110, 112 may also include, but are not limited to, the following devices: wearable computers, personal fitness devices, cameras, GPS (Global Positioning System) receivers, RFID (Radio-Frequency IDentification) devices such as badge readers, etc.

The server computers 104, data stores 106, and client devices 108, 110, 112, are typically comprised of one or more processors, random access memory (RAM), read-only memory (ROM), and other components such data storage devices and data communications devices. Moreover, the server computers 104, data stores 106, and client devices 108, 110, 112, execute one or more computer programs operating under the control of an operating system. At least some of these computer programs perform various functions and steps as described in more detail below.

System Components

Figure 2:
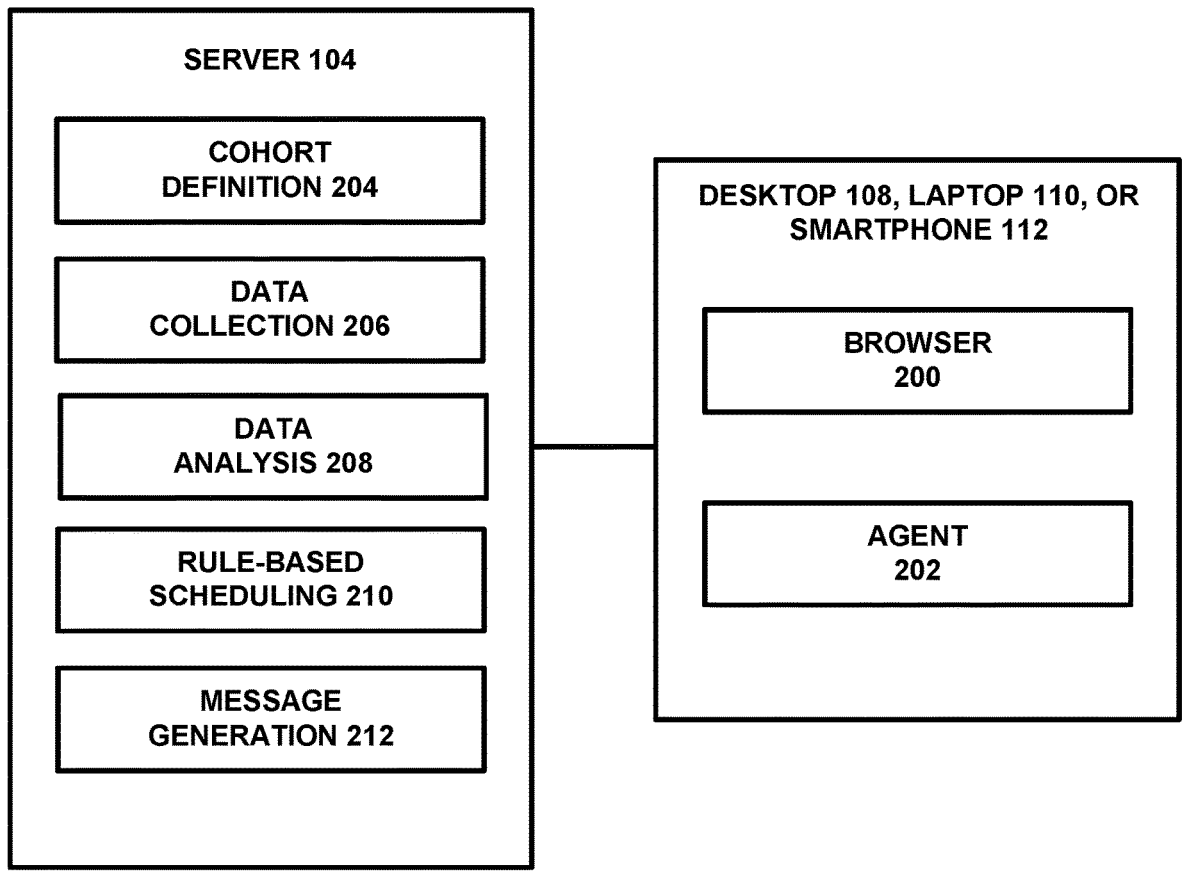
FIG. 2 is a block diagram illustrating how the method and system for providing social-geofenced-based application management for battery maximization is implemented, according to one embodiment.

FIG. 2 is a block diagram illustrating how the system and method for providing social-geofenced-based application management for battery maximization is implemented, according to one embodiment. In this embodiment, the system and method are implemented by:
- a browser 200 and/or an agent 202 executed on the client devices 108, 110, 112, wherein the browser 200 and the agent 202 generate social traffic information for users; and
- a plurality of modules 204-212 executed on the server computers 104 that communicate with the browser 200 and agent 202 installed on the client devices 108, 110, 112 to provide social-geofenced-based application management for battery maximization.

In alternative embodiments, these functions and steps may be wholly or partially performed on the server computers 104 and/or client devices 108, 110, 112.

In one embodiment, the server computers 104 and the data stores 106 together provide the functionality associated with the Watson™ services offered by International Business Machines, the assignee of the present invention. However, the invention could easily apply to other social geofencing and battery management applications.

To provide social-geofenced-based application management for battery maximization, the server computers 104 implement the following modules and functionality.

A Cohort Definition Module 204 defines a cohort comprised of one or more persons, which includes at least one user having a client device 108, 110, 112 that is the target of the battery maximization techniques. The cohort may be based on one or more individual or group attributes, such as, but not limited to, age, gender, work location, home location, commuting mode and route, personal interests, type of client devices 108, 110, 112 used for both work and personal matters, etc.

A Data Collection Module 206 monitors the defined cohort of persons within one or more predefined geofences, wherein a geofence comprises a virtual geographic boundary defined by a latitude, longitude and altitude derived from GPS, RFID, or other technology. The Data Collection Module 206 continuously collects social traffic information for the client devices 108, 110, 112 related to the cohort and/or geofence, as well as aggregating the social traffic information across a plurality of cohorts and/or geofences. The social traffic information may include battery usage of devices for the defined cohort of persons within the predefined geofences. The Data Collection Module 206 may also determine when one of the client devices 108, 110, 112 of the cohort enters or leaves the predefined geofences.

A Data Analysis Module 208 analyzes the social traffic information to classify conditions derived therefrom into one or more categories. This analysis may include identifying any changes to the user's routine based on the social traffic information, and determining how best to optimize the battery usage of the user's device 108, 110, 112 resulting from the changes. The Data Analysis Module 208 further categorizes the social traffic information by analyzing information concerning ongoing events in the vicinity of the predefined geofences, such as work-related events, social events with co-workers, social events with family members, public events, or other types of social events.

A Rule-Based Scheduling Module 210 can download rules onto the client devices 108, 110, 112 for controlling application performance at specified times based on the conditions classified into the categories. The browser 200 and/or agent 202 executed on the client devices 108, 110, 112 include a rule engine for performing the rules downloaded by the Rule-Based Scheduling Module 210.

For example, assume that Google™, Facebook™ and/or Twitter™ services cannot be accessed in certain locales due to government policy. The Rule-Based Scheduling Module 210 may recognize that the client devices 108, 110, 112 currently are or in the future may be present in those locales, and downloads one or more rules that instruct the client devices 108, 110, 112 not to transmit data to or from these services while present in those locales.

In another example, the Rule-Based Scheduling Module 210 recognizes that the client devices 108, 110, 112 are located in a moving vehicle, where some applications may perform worse or better than others, and downloads one or more rules that instruct the client devices 108, 110, 112 to execute or not execute those applications in order to optimize battery usage.

In yet another example, the Rule-Based Scheduling Module 210 recognizes that the client devices 108, 110, 112 currently are or in the future may be present in a particular location, where battery usage needs to be conserved, and downloads one or more rules that instruct the client devices 108, 110, 112 not to transmit data to or from the client devices 108, 110, 112 while in that location in order to save battery life.

A Message Generation Module 212 generates messages to notify the client devices 108, 110, 112 of rule updates concerning system policies, polling, notifications, and the like, as well as alert the user with charging reminders for the client devices 108, 110, 112.

The Message Generation Module 212 can be triggered to generate messages in different ways, for example, including the following:
1. Messages can be sent to the client devices 108, 110, 112 directly or can be sent to the user's email address with pre-configured settings.
2. Messages can be sent to the client devices 108, 110, 112 prior to a certain event to change the settings for the client devices 108, 110, 112 during that event. This would occur, for example, where the user has set preferences on the client devices 108, 110, 112 that allows default settings to be overwritten in this kind of circumstance.
3. Messages can be sent to the client devices 108, 110, 112 when a change in the geofence is detected
4. Messages can be sent to the client devices 108, 110, 112 that includes rules for the client devices 108, 110, 112 to execute at a scheduled time.

Other ways of triggering the Message Generation Module 212 to generate messages may be used as well.

It is anticipated that these various steps and functions will result in the client devices 108, 110, 112 having a sufficient allocation of battery power to execute specific functions and/or applications for targeted usage (e.g., emergency phone calls while traveling in a situation with reduced cell phone coverage).

Use Case

Figure 3:
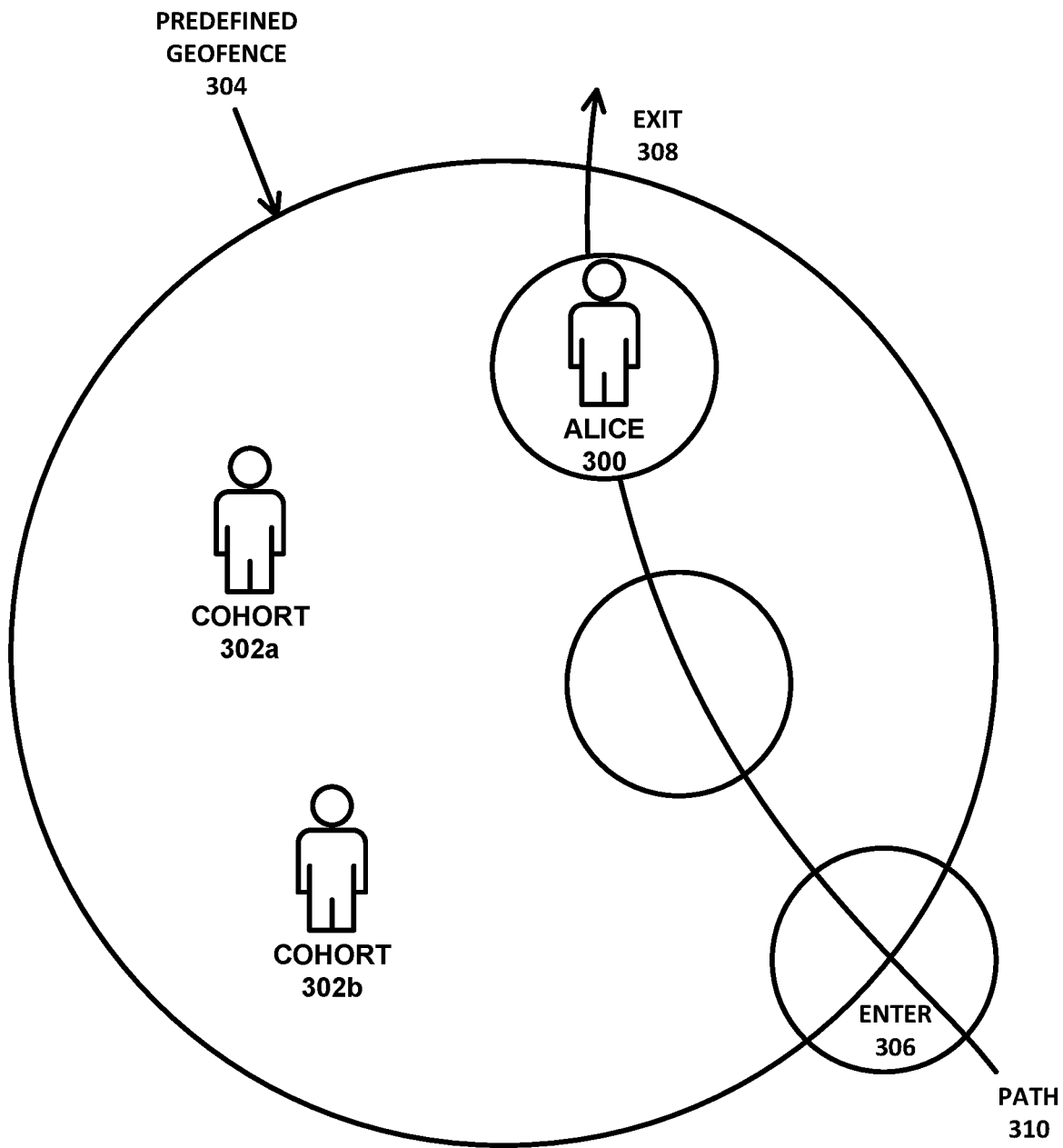
FIG. 3 illustrates a use case for providing social-geofenced-based application management for battery maximization, according to one embodiment.

Consider the following use case illustrated in FIG. 3, where the system 100 is used for providing social-geofenced-based application management for battery maximization.

In this example, a user (Alice) 300 works in the Boston area five days a week. Alice 300 usually charges her smartphone 112 the night before she goes to work. The cell phone coverage for her smartphone 112 is usually pretty good in the Boston area and she can also charge her smartphone 112 in the office as needed.

Alice 300 is going to travel with her family in a few days for a vacation. Alice 300 posts, on her Facebook™ wall, a message saying that her family will be going to a mountain resort for skiing soon. In traveling by car to the mountain resort, Alice 300 and her family will have to drive through a few areas where there is reduced cell phone coverage.

Using this social traffic information, the system 100 optimizes the battery usage of Alice's 300 smartphone 112 in response to these events. The system 100 will issue a set of rules that maximize the battery life of Alice's 300 smartphone 112, so that Alice 300 can use her smartphone 112 for emergency situations when driving through areas of reduced cell phone coverage to the mountain resort.

To accomplish these functions and steps, the system 100 performs the following steps and functions:

The Cohort Definition Module 204 defines a cohort to include Alice 300, as well as one or more persons 302*a*, 302*b* with one or more similar attributes as Alice 300:

18 to 65 years old female.

Work in the downtown Boston area, with a predefined geofence 304 comprising a 1 mile radius around a center point having coordinates 42 N Latitude and 71 W Longitude.

Take commuter rail to go to work.

Listen to WMJX-FM 106.7 on the way to work.

Uses client devices 108, 110, 112 for both work and personal matters.

The Data Collection Module 206 monitors Alice 300 and the other members 302*a*, 302*b* of the defined cohort within the predefined geofence 304. The Data Collection Module 206 may also monitor other members 302*a*, 302*b* of the defined cohort within another predefined geofence 304, such as the route from Alice's 300 home to the mountain resort. Specifically, the Data Collection Module 206 continuously collects social traffic information for Alice 300 and the other members 302*a*, 302*b* of the defined cohort.

This may include monitoring battery usage for the client devices 108, 110, 112 of Alice 300 and the other members 302*a*, 302*b* of the defined cohort. In addition, this may include monitoring when Alice 300, and/or the other members 302*a*, 302*b* of the defined cohort, enter 306 and/or exit 308 the predefined geofences 304, as well as their path 310 through the predefined geofences 304.

Moreover, the predefined geofences 304 may change position as Alice 300, and/or the other members 302*a*, 302*b* of the defined cohort, change positions, or in anticipation of Alice 300 and/or the other members 302*a*, 302*b* of the defined cohort changing locations. As noted above, there may be a plurality of the predefined geofences 304 being monitored.

The Data Analysis Module 208 analyzes the social traffic information to classify conditions derived therefrom into one or more categories, such as work-related events, social events with co-workers, social events with family members, public events, or other types of social events, in the vicinity of the predefined geofences 304 or elsewhere.

The Rule-Based Scheduling Module 210 downloads rules onto Alice's 300 smartphone 112 for controlling application performance at specified times. The Rule-Based Scheduling Module 210 also collects and categorizes data resulting from the execution of those rules by a rule engine executed by the browser 200 and/or agent 202 executed on Alice's 300 smartphone 112.

For example, the system 100 may recognize that Alice's 300 smartphone 112 is located on a moving vehicle, where some applications may perform better or worse than others, the Rule-Based Scheduling Module 210 may download a rule set that instructs Alice's 300 smartphone 112 to perform or not perform various functions. In this example, the Rule-Based Scheduling Module 210 may download a rule set that instructs Alice's 300 smartphone 112 to execute or not execute various applications, or the Rule-Based Scheduling Module 210 may download a rule set that instructs Alice's 300 smartphone 112 to not transmit data to or from Alice's 300 smartphone 112.

The Message Generation Module 212 generates messages to notify Alice's 300 smartphone 112 of rule updates concerning system policies, polling, notifications, and the like, as well as to alert Alice 300 with charging reminders for her smartphone 112. This may include rule updates recommending to Alice's 300 smartphone 112 traveling in the predefined geofence 304 on the route to the mountain resort, optimal behaviors to limit the battery usage over the predefined geofence 304 as determined by the activities of Alice 300, and/or the other members 302*a*, 302*b* of the defined cohort.

For example, the system 100 may detect a change in the predefined geofence 304 around Alice 300 (e.g., Alice 300 driving to the mountain ski resort area rather than commuting to downtown Boston), and download rules to Alice's 300 smartphone 112 to stop transmitting data to and from her smartphone 112. As a result, a critical application on Alice's 300 smartphone 112 should have enough battery allocation for the targeted usage (e.g., emergency phone calls by Alice 300 while driving to the mountain ski resort area).

Flowchart

Figure 4:
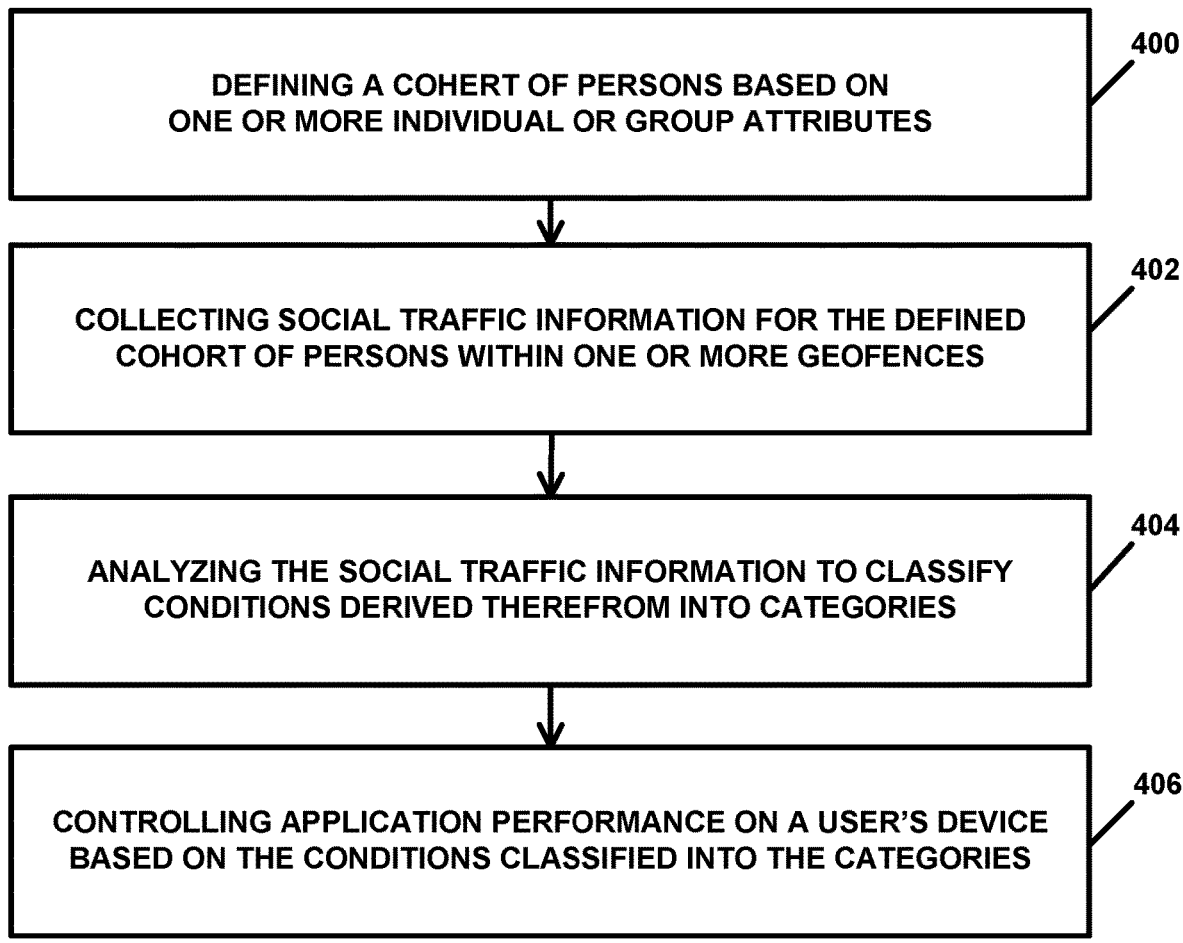
FIG. 4 is a flowchart illustrating the steps performed by the system when implementing the computer-implemented method of this invention, according to one embodiment.

FIG. 4 is a flowchart illustrating the steps performed by the system 100 when implementing the computer-implemented method of this invention, according to one embodiment. Specifically, these steps comprise the system 100 providing social-geofenced-based application management for battery maximization.

Block 400 represents the system 100 defining a cohort of persons, wherein the defined cohort of persons is based on one or more individual or group attributes.

Block 402 represents the system 100 collecting social traffic information for the defined cohort of persons within one or more predefined geofences. The social traffic information may include battery usage of devices for the defined cohort of persons.

Block 404 represents the system 100 analyzing the social traffic information to classify conditions derived therefrom into categories. This may include identifying any changes to the user's routine based on the social traffic information, and determining how best to optimize the battery usage of the user's device 108, 110, 112 resulting from the changes. This also may include analyzing the social traffic information to identify events in a vicinity of the predefined geofences, wherein the events comprise work-related events, social events with co-workers, social events with family members, public events, or other types of social events.

Block 406 represents the system 100 controlling application performance on a user's device 108, 110, 112 based on the conditions classified into the categories, wherein the application performance is controlled to optimize battery usage of the user's device 108, 110, 112 by sending one or more rules to the user's device 108, 110, 112 for execution by a rule engine on the user's device 108, 110, 112.

The application performance may be controlled to prevent transmitting data to or from the user's device 108, 110, 112. The application performance also may be controlled to execute or not execute specified applications on the user's device 108, 110, 112.

In addition, this may include sending messages to notify the user's device 108, 110, 112 of rule updates or charging reminders.

Statutory Subject Matter

It can be seen that the present invention provides a number of benefits and advantages. These benefits and advantages include improvements to the technology or technical field of battery management, and more specifically, providing social-geofenced-based application management for battery maximization. These benefits and advantages also include improvements to the functioning of the devices themselves, including client devices 108, 110, 112, as well as the server computers 104 themselves, as compared to prior computer-implemented methods and systems providing battery management.

With regard to improvements to the technology or technical field, the computer-implemented method and system collects social traffic information of a defined cohort of persons within one or more predefined geofences, analyzes the social traffic information to classify conditions derived therefrom into one or more categories, and controls application performance on the user's device based on the conditions classified into the categories, wherein the application performance is controlled to optimize battery usage of the user's device, in order to provide battery maximization using social-geofenced-based application management.

Both generally and specifically, these steps and functions of the computer-implemented method and system comprise specific improvements other than what is well-understood, routine and conventional in the field. Moreover, these steps and functions of the computer-implemented method and system add unconventional steps to a particular useful application.

The result is improved battery performance with regards to client devices 108, 110, 112, as well as enhanced performance for the server computers 104. Users and administrators are able to rely on the server computers 104 more accurately performing battery management of the client devices 108, 110, 112.

Cloud Computing

It is to be understood that this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
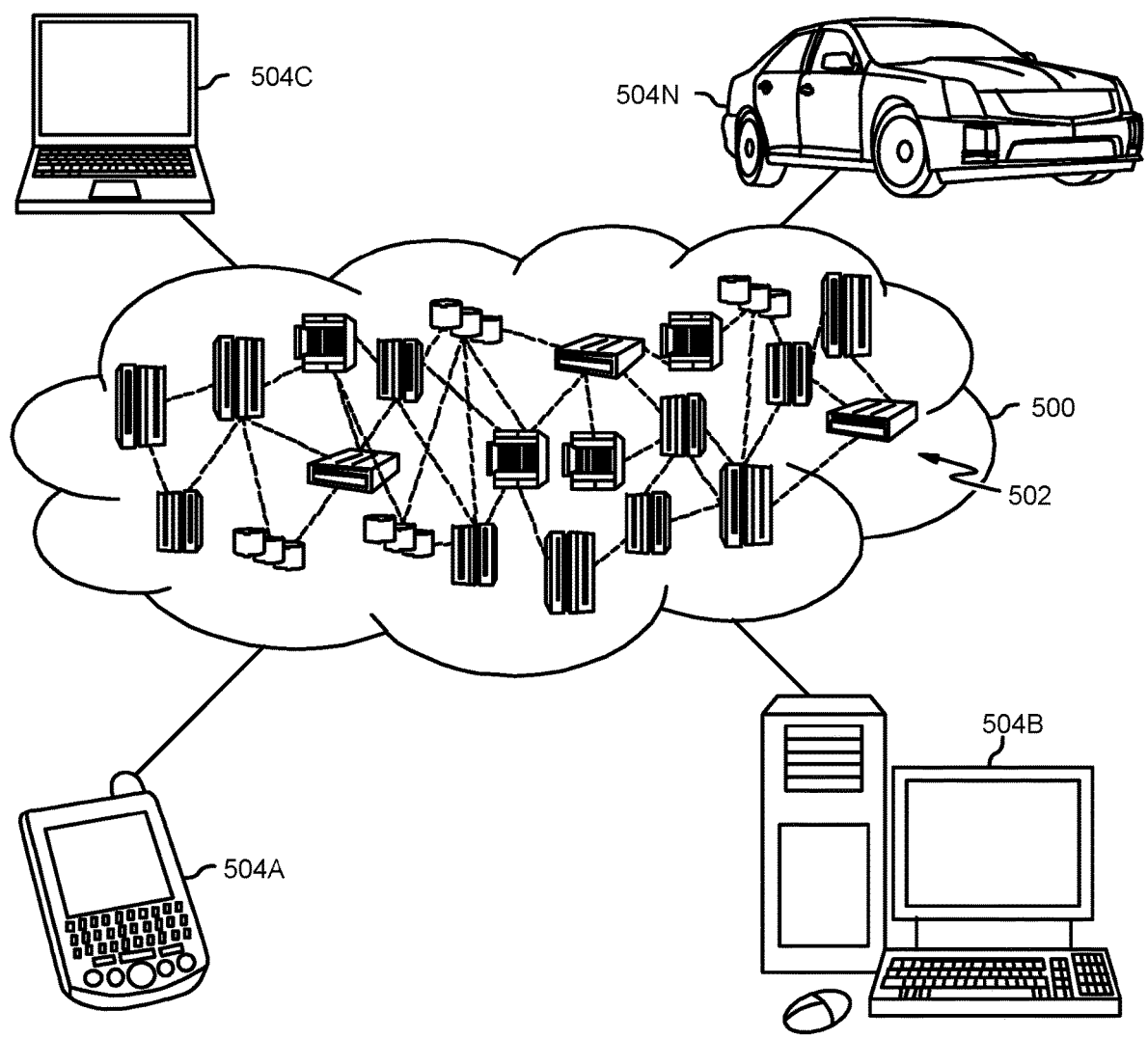
FIG. 5 illustrates a cloud computing environment that may be used to implement the computer-implemented method of this invention, according to one embodiment.

Referring now to FIG. 5, illustrative cloud computing environment 500 is depicted. As shown, cloud computing environment 500 includes one or more cloud computing nodes 502 with which local computing devices used by cloud consumers, such as, for example, personal digital assistant (PDA) or cellular telephone 504A, desktop computer 504B, laptop computer 504C, and/or automobile computer system 504N may communicate. Nodes 502 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 504A-N shown in FIG. 5 are intended to be illustrative only and that computing nodes 502 and cloud computing environment 500 can communicate with any type of computerized device over any type of network and/or network addressable connection (e.g., using a web browser).

Figure 6:
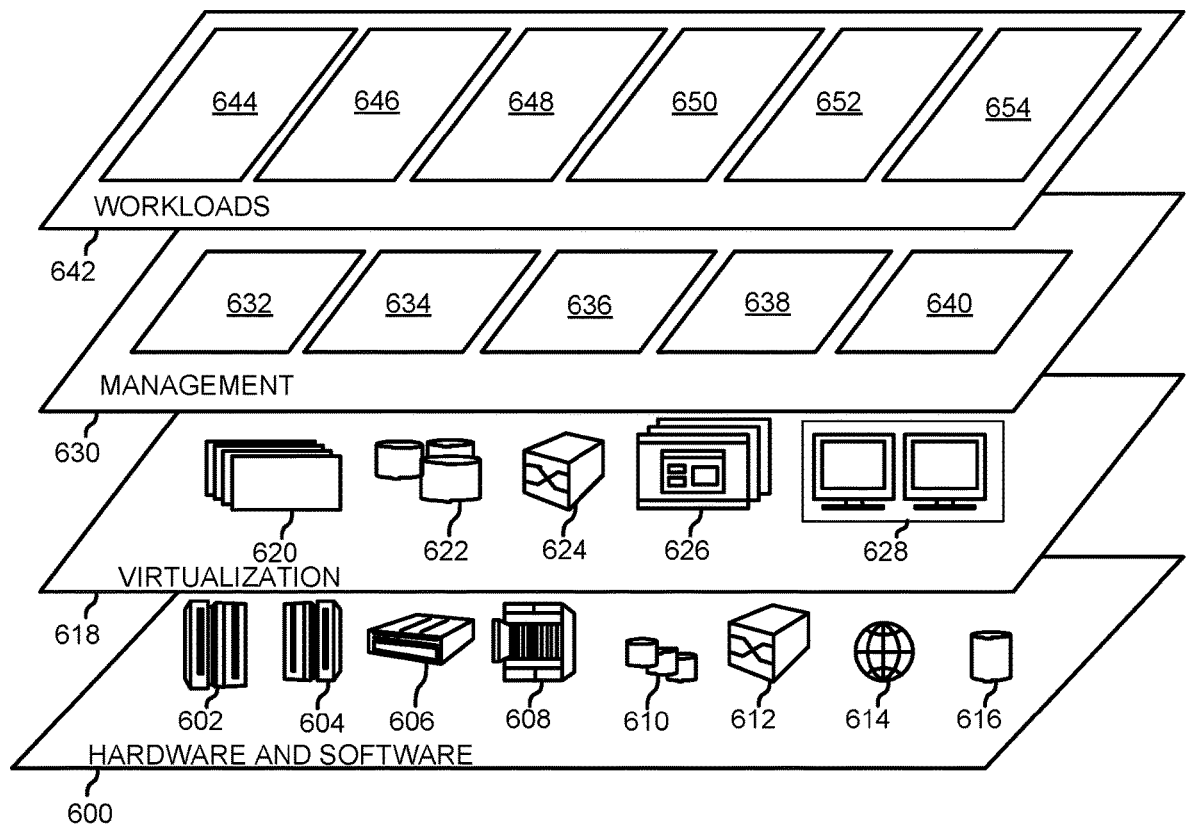
FIG. 6 illustrates a set of functional abstraction layers provided by the cloud computing environment, according to one embodiment.

Referring now to FIG. 6, a set of functional abstraction layers provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 600 includes hardware and software components. Examples of hardware components include: one or more computers such as mainframes 602; RISC (Reduced Instruction Set Computer) architecture based servers 604; servers 606; and blade servers 608; storage devices 610; and networks and networking components 612. In some embodiments, software components include network application server software 614 and database software 616.

Virtualization layer 618 provides an abstraction layer from which the following examples of virtual entities may be provided: virtual servers 620; virtual storage 622; virtual networks 624, including virtual private networks; virtual applications and operating systems 626; and virtual clients 628.

In one example, management layer 630 may provide the functions described above. Resource provisioning 632 provides dynamic procurement of computing resources and other resources that are utilized to perform tasks within the cloud computing environment 500. Metering and pricing 634 provide cost tracking as resources are utilized within the cloud computing environment 500, and billing or invoicing for consumption of these resources. In one example, these resources may include application software licenses. Security provides identity verification for cloud consumers and tasks, as well as protection for data and other resources. User portal 636 provides access to the cloud computing environment 500 for consumers and system administrators. Service level management 638, which includes containers, provides cloud computing resource allocation and management such that required service levels are met. Service Level Agreement (SLA) planning and fulfillment 640 provide pre-arrangement for, and procurement of, cloud computing resources for which a future requirement is anticipated in accordance with an SLA.

Workloads layer 642 provides examples of functionality for which the cloud computing environment 500 may be utilized. Examples of workloads, tasks and functions which may be provided from this layer include: mapping and navigation 644; software development and lifecycle management 646; virtual classroom education delivery 648; data analytics processing 650; transaction processing 652; etc. More specifically, this layer includes the workloads, tasks and functions for providing social-geofenced-based application management for battery maximization 654 described above.

Computer Program Product

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart illustrations and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart illustrations and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart illustrations and/or block diagram block or blocks.

The flowchart illustrations and block diagrams in the Figures illustrate the architecture, functionality, and operation of possible implementations of systems, methods, and computer program products according to various embodiments of the present invention. In this regard, each block in the flowchart illustrations or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

CONCLUSION

This concludes the description of the various embodiments of the present invention. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Since many embodiments of the invention can be made without departing from the spirit and scope of the invention, the invention resides in the claims hereinafter appended.

What is claimed is:

1. A computer-implemented method, comprising: providing social-geofenced-based application management for battery maximization, by:
    collecting social traffic information of a defined cohort of persons within one or more predefined geofences;
    analyzing the social traffic information to classify conditions derived therefrom into one or more categories; and
    controlling application performance on a user's device based on the conditions classified into the categories, wherein the application performance is controlled to optimize battery usage of the user's device, wherein the controlling of the application performance comprises:
        determining that a first set of services cannot be accessed in one or more locales due to government policy; and
        in response to determining that the user's device will be present in the one or more locales in future, downloading, to the user's device, one or more rules that instruct the user's device not to transmit data to or from the first set of services while the user's device is present in the one or more locales.

2. The computer-implemented method of claim 1, wherein the social traffic information comprises battery usage of devices for the defined cohort of persons.

3. The computer-implemented method of claim 1, wherein the analyzing further comprises identifying any changes to the user's routine based on the social traffic information, and determining how best to optimize the battery usage of the user's device resulting from the changes.

4. The computer-implemented method of claim 1, wherein the controlling of the application performance further comprises:
   determining that a second set of services has worse performance than a third set of services in a moving vehicle; and
   downloading, to the user's device, additional rules that instruct the user's device not to execute the second set of services in the moving vehicle.

5. The computer-implemented method of claim 1, wherein the controlling of the application performance further comprises:
   determining that battery life needs to be conserved in the user's device in a one or more predetermined locations; and
   downloading, to the user's device, additional rules that instruct the user's device not to execute transmit data to or from the user's device in the one or more predetermined locations.

6. The computer-implemented method of claim 1, wherein the controlling of the application performance further comprises:
   downloading additional rules to the user's device to conserve battery life to use the user's device in emergency situations while driving.

7. A computer-implemented system, comprising: one or more computers programmed for providing social-geofenced-based application management for battery maximization, by: collecting social traffic information of a defined cohort of persons within one or more predefined geofences;
   analyzing the social traffic information to classify conditions derived therefrom into one or more categories; and
   controlling application performance on a user's device based on the conditions classified into the categories, wherein the application performance is controlled to optimize battery usage of the user's device, wherein the controlling of the application performance comprises:
      determining that a first set of services cannot be accessed in one or more locales due to government policy; and
      in response to determining that the user's device will be present in the one or more locales in future, downloading, to the user's device, one or more rules that instruct the user's device not to transmit data to or from the first set of services while the user's device is present in the one or more locales.

8. The computer-implemented system of claim 7, wherein the social traffic information comprises battery usage of devices for the defined cohort of persons.

9. The computer-implemented system of claim 7, wherein the analyzing further comprises identifying any changes to the user's routine based on the social traffic information, and determining how best to optimize the battery usage of the user's device resulting from the changes.

10. The computer-implemented system of claim 7, wherein the controlling of the application performance further comprises:
    determining that a second set of services has worse performance than a third set of services in a moving vehicle; and
    downloading, to the user's device, additional rules that instruct the user's device not to execute the second set of services in the moving vehicle.

11. The computer-implemented system of claim 7, wherein the controlling of the application performance further comprises:
    determining that battery life needs to be conserved in the user's device in a one or more predetermined locations; and
    downloading, to the user's device, additional rules that instruct the user's device not to execute transmit data to or from the user's device in the one or more predetermined locations.

12. The computer-implemented system of claim 7, wherein the controlling of the application performance further comprises:
    downloading additional rules to the user's device to conserve battery life to use the user's device in emergency situations while driving.

13. A computer program product, the computer program product comprising a computer readable storage medium having program instructions embodied therewith, the program instructions executable by one or more computers to cause the computers to perform a method, comprising:
    providing social-geofenced-based application management for battery maximization, by: collecting social traffic information of a defined cohort of persons within one or more predefined geofences;
    analyzing the social traffic information to classify conditions derived therefrom into one or more categories; and
    controlling application performance on a user's device based on the conditions classified into the categories, wherein the application performance is controlled to optimize battery usage of the user's device, wherein the controlling of the application performance comprises:
       determining that a first set of services cannot be accessed in one or more locales due to government policy; and
       in response to determining that the user's device will be present in the one or more locales in future, downloading, to the user's device, one or more rules that instruct the user's device not to transmit data to or from the first set of services while the user's device is present in the one or more locales.

14. The computer program product of claim 13, wherein the controlling of the application performance further comprises:
    determining that a second set of services has worse performance than a third set of services in a moving vehicle; and
    downloading, to the user's device, additional rules that instruct the user's device not to execute the second set of services in the moving vehicle.

15. The computer program product of claim 13, wherein the controlling of the application performance further comprises:
    determining that battery life needs to be conserved in the user's device in a one or more predetermined locations; and downloading, to the user's device, additional rules that instruct the user's device not to execute transmit data to or from the user's device in the one or more predetermined locations.

16. The computer program product of claim 13, wherein the controlling of the application performance further comprises:
   downloading additional rules to the user's device to conserve battery life to use the user's device in emergency situations while driving.

17. The computer program product of claim 13, wherein the social traffic information comprises battery usage of devices for the defined cohort of persons.

18. The computer program product of claim 13, wherein the analyzing further comprises identifying any changes to the user's routine based on the social traffic information, and determining how best to optimize the battery usage of the user's device resulting from the changes.

\* \* \* \* \*